United States Patent [19]
Kowalski

[11] Patent Number: 6,003,777
[45] Date of Patent: Dec. 21, 1999

[54] MICROCIRCUIT CHIP CARD WITH CONTACT AND CONTACTLESS OPERATING MODES

[75] Inventor: Jacek Kowalski, Trets, France

[73] Assignee: Inside Technologies, Saint Clement Les Places, France

[21] Appl. No.: 09/226,553

[22] Filed: Jan. 7, 1999

Related U.S. Application Data

[63] Continuation of application No. PCT/FR97/01230, Jul. 8, 1997.

[30]     Foreign Application Priority Data

Aug. 5, 1996 [FR] France ................................... 96 10032

[51] Int. Cl.$^6$ .................................................. G06K 19/06
[52] U.S. Cl. .......................... 235/492; 235/439; 235/451; 902/26
[58] Field of Search ..................... 235/492, 379, 235/380, 439, 451; 902/26

[56]              References Cited

U.S. PATENT DOCUMENTS

| | | | |
|---|---|---|---|
| 4,837,556 | 6/1989 | Matsushita et al. ................. | 340/310 R |
| 5,206,495 | 4/1993 | Kreft ....................................... | 235/492 |
| 5,285,370 | 2/1994 | Axer et al. ................................ | 363/59 |
| 5,362,954 | 11/1994 | Komatsu .................................. | 235/492 |
| 5,610,384 | 3/1997 | Goto ........................................ | 235/435 |
| 5,670,772 | 9/1997 | Goto ..................................... | 235/492 X |
| 5,671,254 | 9/1997 | Nagata et al. ........................... | 375/326 |
| 5,831,348 | 11/1998 | Nishizawa ....................... | 340/310.07 X |
| 5,898,738 | 4/1999 | Nagata et al. ....................... | 235/492 X |

*Primary Examiner*—Michael G Lee
*Attorney, Agent, or Firm*—Akin, Gump, Strauss, Hauer & Feld, L.L.P.

[57]              ABSTRACT

A microcircuit with two contact and non-contact operating modes, including communication device (2) specific for the non-contact operating mode, communication device (3) specific for the contact operating mode, electronic circuit (4) common to both operating modes, a coil (L) for receiving an AC voltage (Va) by induction, a rectifier circuit (Pd) for rectifying the AC voltage (Va) to give a first microcircuit power supply voltage (Vcc1), at least one power supply contact (p1) for receiving a second microcircuit power supply voltage (Vcc2) a distribution line (5) for distributing the first (Vcc1), or second (Vcc2) power supply voltages, a switch circuit (6, 13) between the power supply contact (P1) and the distribution line (5), and controller (7, 8) for controlling the switch circuit, which controller (7, 8) are arranged to sense the AC voltage (Va) across the terminals of the coil (L), and close the switch circuit (6, 13) when the second power supply voltage (Vcc2) is present on the power supply contact, or give priority to opening the switch circuit when the AC voltage (Va) is present across the terminals of the coil.

11 Claims, 3 Drawing Sheets

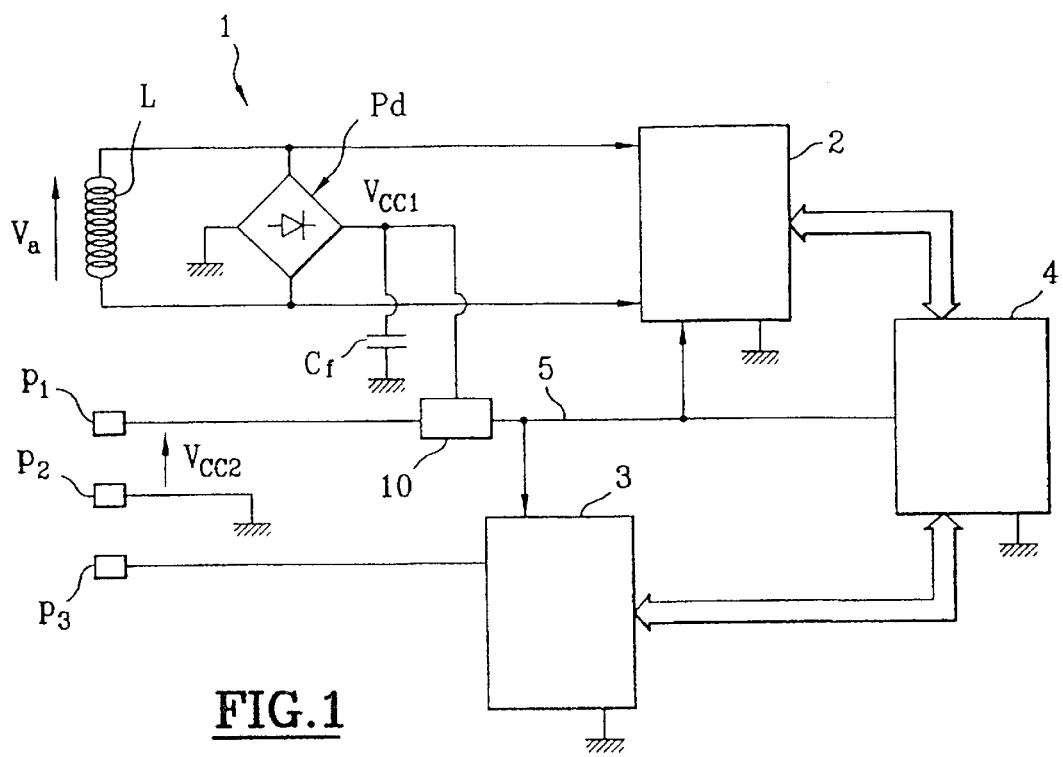
FIG.1
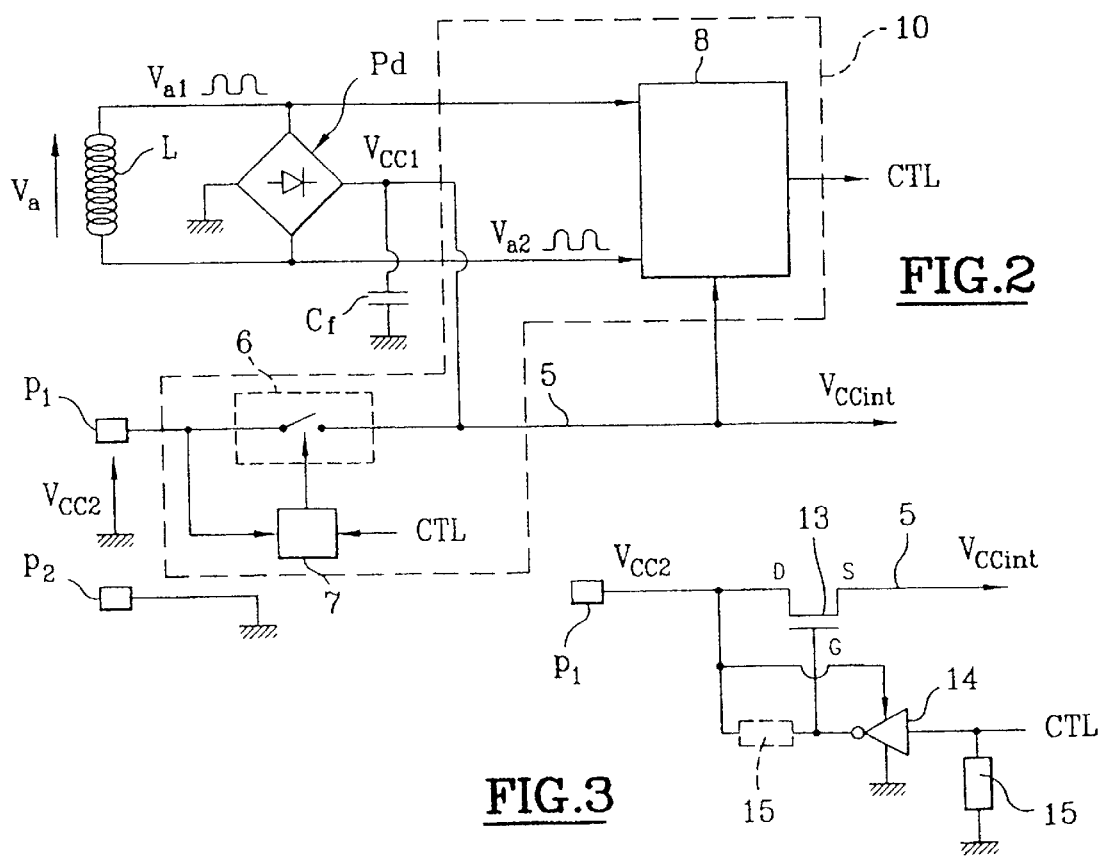
FIG.2
FIG.3

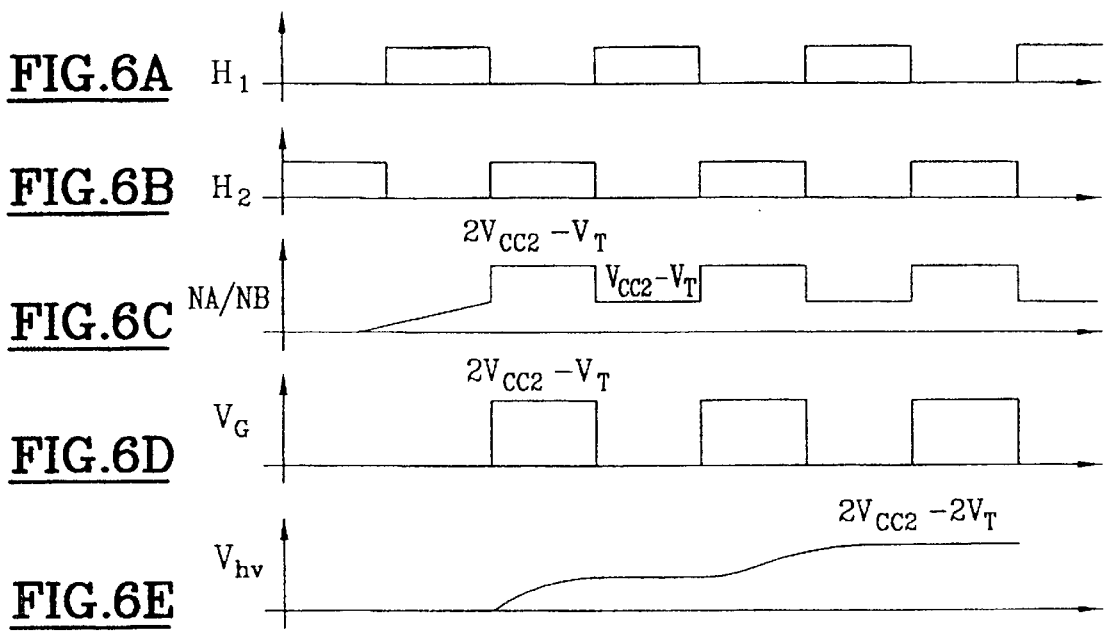
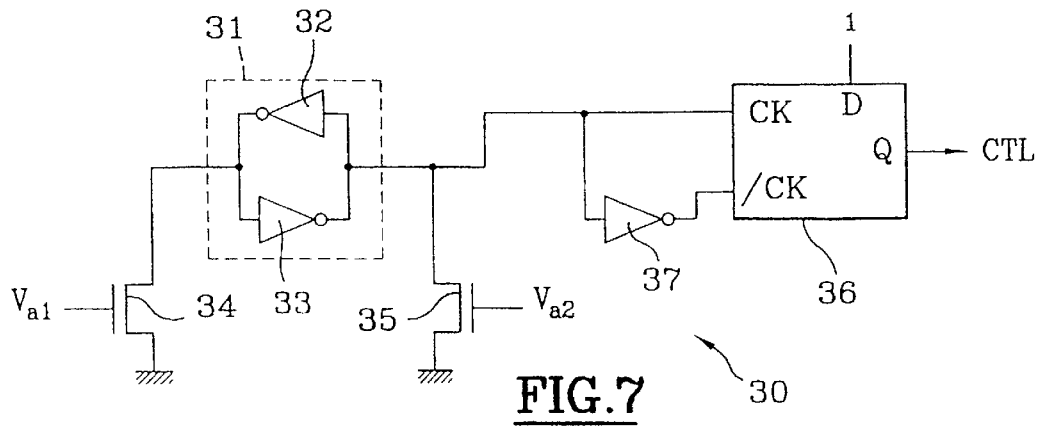
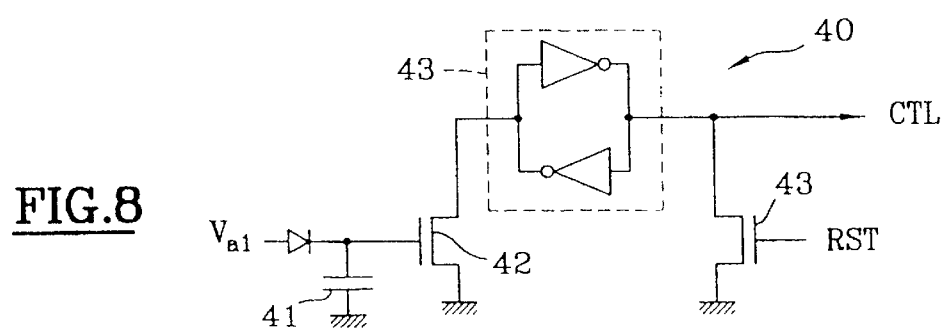

MICROCIRCUIT CHIP CARD WITH CONTACT AND CONTACTLESS OPERATING MODES

CROSS-REFERENCE TO RELATED APPLICATION

This application is a continuation of International Application PCT/FR97/01230, filed Jul. 8, 1997, the disclosure of which is incorporated herein by reference.

BACKGROUND OT THE INVENTION

The present invention relates to a microcircuit with two operating modes, i.e. a contact mode and a contactless mode.

At the present time, the market of chip cards and in a general way the market of electronic chips mounted on portable supports comprises two fields the one of applications called "contact applications" an the one of "contactless applications". In a near future, contactless chip cards should have an important development, when, simultaneously, a lot of contact cards will still be used. Thus, to rationalise the market of chip cards, it has been thought to develop microcircuits with both operating modes, contact or contactless, able to communicate with any kind of chip card reader.

U.S. Pat. No. 5,206,495 discloses a chip card microcircuit with two operating modes, contact or contactless, whose structure will be recalled. The reference numerals between square brackets refer to FIG. 3 of this document.

The microcircuit [2] of the prior art comprises contacts [3] for the operating mode with contact and induction coils [4, 5] for the contactless operating mode. The induction coils are associated with a rectifier circuit [2.1.1] to provide a DC supply voltage U1 in the contactless working mode. In the contact working mode, a DC supply voltage U2 is provided by a supply contact [I6].

Essentially, the prior art document proposes to send to a microcomputer [2.2], by means of a multiplexer [2.1.3], the signals received by the contacts [3] and the signals received by the coils [4, 5]. The signals received by the coils [4, 5] are applied to the multiplexer [2.1.3] by means of a converter [2.1.4]. The microcomputer [2.2] forms thus a means for processing the signal common to the two operating modes, and the multiplexer [2.1.3] forms a switching unit allowing the connection of the microcomputer to the contacts [3] or to the converter [2.1.4], depending on the operating mode of the microcircuit. The discrimination of the operating mode, for controlling the multiplexer [2.1.3], is performed by a comparator [2.1.2] with two inputs [E1, E2], providing at its output [E3] a discrimination signal applied to the multiplexer [2.1.3]. The comparator [2.1.2] receives on a first input [E2] a DC voltage U2 coming from the supply contact [I6] and on a second input [E1] a DC voltage U1 coming from the rectifier [2.1.1].

Although satisfactory at first sight, the prior art microcircuit presents various drawbacks in practice.

A first drawback lies in the detection of the operating mode by means of the above-mentioned comparator [2.1.2], which receives the supply voltages U1 and U2 on its inputs [E1, E2]. The voltages U1, U2 are also applied to the supply input [E4] of the comparator [2.1.2] by means of diodes [D1, D2] which are essential to avoid a short circuit between the two comparison inputs [E1, E2]. Now, these diodes cause a substantial decrease of the supply voltage received by the comparator, for example 1 Volt in a CMOS integrated circuit. Thus, in order that the comparator [2.1.2] is able to work, the minimal supply voltage U1 or U2 of the microcircuit must be 1 V above the minimal supply voltage of the comparator. As the voltage U1 provided by the rectifier [2.1.1] in a contactless mode depends on the amplitude of the induced voltage in the coils [4, 5], and therefore on the distance between the microcircuit and the magnetic field source (inductive coupling), the voltage decrease in the diode [D1] must be compensated by an increase of the inductive coupling and implies a substantial decrease of the maximal communication distance which can be permitted between a chip card and a card reader, with the same emitting power of the magnetic field. To have a better idea, in a contactless chip card supplied by induction at the standard frequency of 13.56 MHz and able to work with a very low voltage of about 1 V (CMOS technology), a voltage drop of 1 V in the diode [D1] represents a decrease of several centimetres of the maximal distance card/reader, the supply voltage U1 having to be at least equal to 2 V for being 1 V on the supply input [E4] of the comparator.

Another drawback of the prior art microcircuit is the manner to deal with an eventual ambiguity between the supply voltages U1, U2 of the contact mode and the contactless mode. By "ambiguity" is meant the case where, simultaneously, the supply voltages U1 and U2 are present. In particular, the applicant has discovered that the fingers of a user which touches the contacts during the contactless mode can inject into the microcircuit static electricity charges capable to disturb its working and even to block it. In the prior art document, it is provided that the output [E3] of the comparator, producing the signal which discriminates the operating mode, is preferably non ambiguous as regards as the value of the voltages U1, U2. However, the present invention is based on the following constatation: in order that the output of the comparator [2.1.2] is non ambiguous when voltages U1, U2 are present simultaneously, and at high levels, it is necessary to give arbitrarily priority to one of the two voltages only. If priority is given to the voltage U1 of the contactless mode to solve the ambiguity case linked to an interfering electrostatic voltage on the contacts, the output of the comparator must be at 1 when the voltage U1 is present, whatever the voltage U2 may be. If the output of the comparator depends only on the voltage U1, it can be concluded that it is not useful at all to provide a comparator. Finally, the idea of using a unambiguous comparator for determining the operating mode implies some questionings about its implementation.

Yet another drawback of the prior art microcircuit lies in the fact that, in order that the signals of the contactless mode which are present on the outputs [K1–K5] of the converter [2.1.4] are fully compatible with the signals coming from the contacts [I1–I6], as it is indicated in the prior art, it is necessary that the converter [2.1.4] transforms these signals into signals received according to the communication protocol of the contact mode. More precisely, as the signals received on the various contacts of a chip card comprise respectively, according to the standard ISO 7816, data in serial form, a clock signal, a reset signal, a supply voltage, it follows that the converter [2.1.4] must provide each of these signals in a standard serial form on its corresponding outputs [K1–K6]. Thus, practically, the converter [2.1.4] must be a "protocol converter", or "adapter", having a great complexity and a high manufacturing cost. Here also, the implementation of the idea of multiplexing the input signals towards a common means for processing the communications is subject to significant practical difficulties.

SUMMARY OF THE INVENTION

Thus, the present invention has the object to provide a microcircuit with two operating modes:

able to be implemented in a simple way using conventional interface circuits of the contactless type and the contact type, comprising means for detecting the operating mode without the above mentioned drawbacks, comprising a circuit for distributing a supply voltage able to manage, when switched on, the eventual conflicts between contact mode and contactless mode voltages, and which assumes the protection against electrostatic discharges.

In a general way, the present invention provides a microcircuit:

without multiplexing the input signals, the communication (or interfacing) means for the contact mode and the contactless mode being materially different, comprising a switch associated with the contact which receives the supply voltage in the contact mode, where the supply voltage in the contactless mode is able to be sent directly on the internal supply line of the microcircuit, without voltage loss, wherein the discrimination of the operating mode is performed by detecting the AC voltage on the terminals of the induction coil, instead of being performed by detecting the rectified AC voltage, and wherein priority is given to the contactless mode when the AC voltage appears.

More particularly, the present invention provides a microcircuit with two operating modes, contact or contactless, comprising communication means specific to the contactless operating mode, communication means specific to the contact operating mode, electronic means common to the two operating modes, a coil for receiving an AC voltage by induction, a circuit which rectifies the AC voltage to produce a first microcircuit supply voltage, at least one supply contact for receiving a second microcircuit supply voltage, a distribution line for the first and second supply voltages, a switching means arranged between the supply contact and the distribution line, and means for controlling the switching means, designed to detect the AC voltage on the coil terminals, to close the switching means when the second supply voltage is present on the supply contact, or to open in priority the switching means when the AC voltage is present on the terminals of the coil.

According to one embodiment, the output of the rectifier circuit is directly and continuously connected to the distribution line.

According to one embodiment, the means for controlling the switching means comprise a detector for detecting oscillations of the AC voltage.

According to one embodiment, the means for controlling the switching means comprise a threshold detector of the AC voltage.

According to one embodiment, the means for controlling the switching means comprise a booster circuit providing a voltage for closing the switching means.

According to one embodiment, the booster circuit comprises a first charge pump whose output is applied to a storing capacity by means of a transistor driven by a second charge pump working in phase with the first pump charge.

According to one embodiment, the switching means comprise a NMOS transistor and a PMOS transistor arranged in series, to protect against positive and negative electrostatic discharges.

According to one embodiment, the communication means specific to the contact mode are directly supplied from the supply contact, and the means which are common to the two operating modes are supplied from the distribution line.

The present invention also refers to a chip card which comprises a microcircuit according to the invention.

These characteristics of the present invention, as well as others, will be described with more details in the following description of a structure of a microcircuit with two operating modes according to the invention, of a system for distributing a supply voltage to the microcircuit, and of various embodiments of some elements of the distributing system, in conjunction with the accompanying figures, in which:

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiment(s) which are presently preferred. It should be understood, however, that the invention is not limited to the precise arrangements and instrumentalities shown. In the drawings:

FIG. 1 represents the general architecture of a microcircuit with two operating modes according to the invention, for a chip card or another portable support, FIG. 2 represents schematically in block form a system according to the invention for distributing a supply voltage in the microcircuit of FIG. 1, FIG. 3 is the electrical diagram of a circuit for controlling a switch, represented in block form in FIG. 2, FIG. 7 is the electrical diagram of a detector of an AC voltage, represented in block form in FIG. 2, and FIG. 8 represents another embodiment of the detector of FIG. 7.

DETAILED DESCRIPTION OF THE INVENTION

Figure 4:
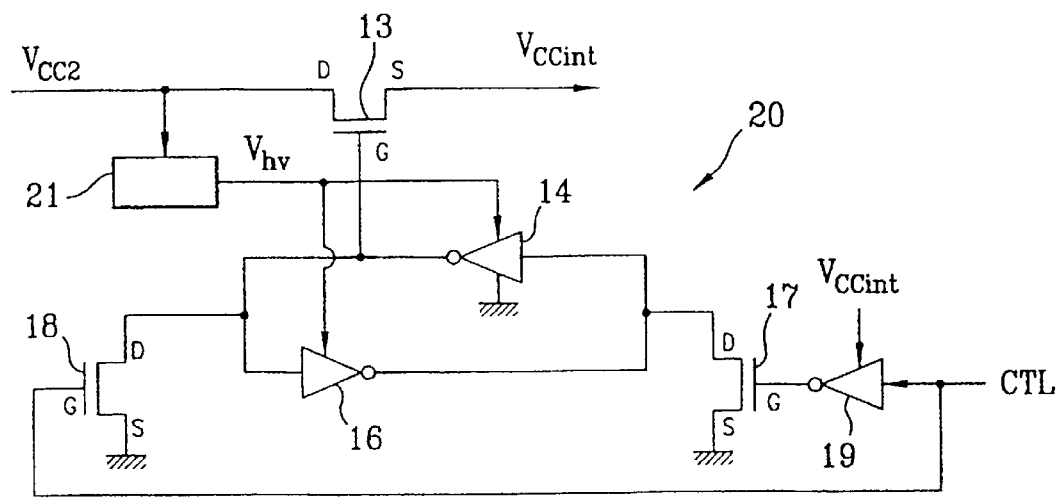
FIG. 4 represents an alternative embodiment of the control circuit of FIG. 3.

FIG. 1 represents, in a very schematic way, the general architecture of a microcircuit with two operating modes according to the invention, suitable for a chip card or any other portable support of integrated circuit. The electronic means present in the microcircuit 1 are represented in the form of three blocks 2, 3, 4. Block 2 represents the whole of the electronic means specific to the communication in the contactless mode, block 3 the whole of the electronic means specific to the communication in the contact mode and block 4 represents means common to the two operating modes, each mean being functionally and physically different from the others.

In the contactless mode, the microcircuit is surrounded by an oscillating magnetic field emitted for example by a chip card reader. The block 2 receives digital data by means of a coil L on the terminals of which an amplitude or frequency modulated AC voltage Va appears by electromagnetic induction. Thus, for example, the block 2 comprises a demodulating circuit, a circuit for generating or extracting a clock signal, and a circuit for ensuring the management of the contactless communication protocol, optionally including the management of communication collisions. The functions performed by the block 2 are conventional in themselves in microcircuits working contactless only. Moreover, the AC voltage Va is rectified by a rectifying bridge Pd using diodes or transistors which produces, by means of a filtering capacity Cf, the supply voltage Vcc1 in the contactless mode. Of course, in practice, the coil L can be designed in the form of a single or several windings and comprise for example, in a conventional way, a first coil for receiving the electrical energy and a second coil for data transmission.

In the contact mode, the microcircuit receives a supply voltage Vcc2, generally a DC voltage, by means of a supply contact p1 and a grounded contact p2. The voltage Vcc2 can be applied to the contact p1 by an external device like a chip card reader or by a battery mounted on the microcircuit support. Conventionally, bloc 3 receives and emits digital data by means of a contact p3. Other standard contacts, not shown in FIG. 1, can be provided to apply a clock signal and a reset signal RST to block 3. Bloc 3 assumes the management of the communication protocol in the contact mode, the data synchronisation, etc., these functions being in themselves usual in contactless chip card microcircuits.

Lastly, the bloc 4 intervenes in the two operating modes, and comprises the means common to the two operating modes, for example an electrically erasable and programmable EEPROM memory to store identification data, transaction data, . . . The bloc 4 may also comprise a microprocessor or wired logic means to perform conventional high level operations, for example generation of an authentication code by cryptography, checking of a secret code presented by a card reader, recording of data into the memory, etc., some parts of these means being however able to be carried back to the blocks 2 and 3.

The data communication between the block 4 and the blocks 2 and 3 can be obtained by any means, for example by exchanges of packets of parallel data through buffer circuits. In the circuit according to the invention, it is not essential to normalise the data transfer between the block 4 and the other blocks, and to provide a protocol conversion. Also, block 4 may comprise an input/output port for the data coming from block 3 and another input/output port for data coming from block 2, etc., according to the choice of the man skilled in the art.

The distribution of one of the electrical supply voltages Vcc1 or Vcc2 to the blocks 2, 3 and 4, by means of an internal distribution line 5, is assumed by a distribution system 10 according to the invention, represented with more details in FIG. 2.

The system 10 comprises a switch 6 arranged between the contact p1 and the distribution line 5, when the output of the rectifier bridge Pd is here directly connected to the distribution line 5. The switch 6 is controlled by a circuit 7 receiving the voltage Vcc2 on a first input and a signal CTL on a second input. The signal CTL is produced by a detector 8 of the AC voltage Va, connected to the terminals of the coil L and supplied by the voltage Vccint. By convention, it will be considered in the following that the signal CTL produced by the detector 8 is at 1 when the AC voltage Va is present on the coil L, and at 0 in an opposite case. The working of the control circuit 7 is as follows:

1) when the voltage Vcc2 is not at zero and the signal CTL is at 0 (no voltage Va on the coil L), the circuit 7 closes the switch 6 so that the voltage Vcc2 is present on the distribution line 5.

2) when the signal CTL is at 1 (the voltage Va on the coil L is detected), the circuit 7 opens the switch 6 in priority, whether the voltage Vcc2 is at zero or not, so that only the voltage Vcc1 produced by rectifying the voltage Va is present on the distribution line 5.

A third case, which is secondary, is when the voltage Vcc2 on the contact p1 is at zero and the signal CTL is at 0. No one of two voltages Vcc1 or Vcc2 being present, the state of the switch 6 is without importance and the latter will be generally closed because the supply is lacking.

Thus, when the voltage Vcc1 and Vcc2 are not at zero, the control circuit 7 gives priority to the voltage Vcc1 by opening the switch 6. The system 10 according to the invention allows the management of the eventual conflicts between the voltages Vcc1 and Vcc2, when the microcircuit is powered on, and also protects the distribution line 5 against eventual electrostatic discharges coming from the contact p1.

Of course, the system 10 operates only when the microcircuit is powered on. Once the supply voltage has been stabilised, the state of the system 10 can be locked by any means, for example by means of the conventional signal POR (Power On Reset) which is present in most the contact or contactless microcircuits.

Furthermore, the discrimination of the contactless mode by a direct detection of the voltage Va on the coil L is an aspect of the present invention which allows to open rapidly the switch 6 since the moment when the coil L is in presence of an inducting magnetic field. In particular, the detector 8 can be designed in the form of an oscillation detector, more rapid than a threshold detector, as will be seen later.

FIG. 3 represents an embodiment of the switch 6 and of the control circuit 7. The switch is here a NMOS transistor 13 whose drain D is connected to the contact p1 and whose source S is connected to the distribution line 5. The control circuit takes the form of an inverting gate 14 receiving the signal CTL at its input and whose output feeds the gate G of the transistor 13. To make sure of the closing of the transistor 13 when the voltage Vcc2 appears (that is, before that the voltage Vcc2 is present on the distribution line 5), the supply terminal of the inverting gate 14 is connected to the contact p1 and receives directly the voltage Vcc2. Also, the input of the logic gate 14 is connected to ground by means of a stabilising resistor 15 with a large value so as to be maintained at 0 when the signal CTL is absent. As represented in dotted line, the resistor 15 can also be arranged between the output of the gate 14 and the voltage Vcc2. Lastly, if due to an opposite convention the signal CTL should be at 0 instead of at 1 when the voltage Va is detected on the coil L, another inverting gate should be added in series with the gate 14.

With the embodiment which has just been described, it appears that the voltage Vccint present on the distribution line 5 is substantially below the voltage Vcc2 due to the threshold voltage VT of the transistor 13, generally about 1 volt for a MOS transistor. This problem is less critical than a voltage decrease of the supply voltage in the contactless mode, because it is possible to increase the voltage Vcc2 of the contact mode by a mere adjustment of the voltage levels in the chip card readers, when the voltage Vcc1 of the contactless mode depends on the distance between the chip card and the card reader. However, such a voltage decrease may not be desirable when the supplied voltage Vcc2 is rather low, for example due to stray contact resistances between the card reader and the contact p1, or when the voltage Vcc2 is supplied by a battery.

FIG. 4 represents an embodiment 20 of the control circuit allowing the reduction of this drawback. The control circuit 20 comprises a circuit 21 which boosts the voltage Vcc2 and whose output produces a voltage Vhv. Preferably, the voltage Vhv is at least equal to [Vcc2+VT] so as to compensate the threshold voltage VT of the transistor 13. The voltage Vhv is applied to the supply terminal of the inverting gate 14 whose logic level "1" becomes therefore equal to Vhv.

Furthermore, the control circuit 20 represented in FIG. 4 is designed to ensure the insulation of the voltage Vhv with respect to the voltage Vccint, which represents the logic level "1" of the signal CTL. For this purpose, the output of the inverting gate 14 feeds the input of another inverting gate 16 whose output is fed back to the input of the gate 14, the whole forming so a bidirectional inverting gate. Each of the inputs of the gates 14 and 16 is connected to the drain D of a NMOS reference transistor 17, respectively 18, whose source S is connected to ground. Lastly, the gate G of the transistor 18 is controlled by the signal CTL and the gate of the transistor 17 by an inverse signal of the signal CTL, produced by an inverting gate 19.

The control circuit 20 works like an inverting gate: the signal CTL at 0 turns ON the transistor 17 by means of the gate 19, the transistor 17, which is conducting, sets to 0 the input of the gate 14, and the output of the gate 14 produces the voltage Vhv on the gate G of the transistor 13.

Figure 5:
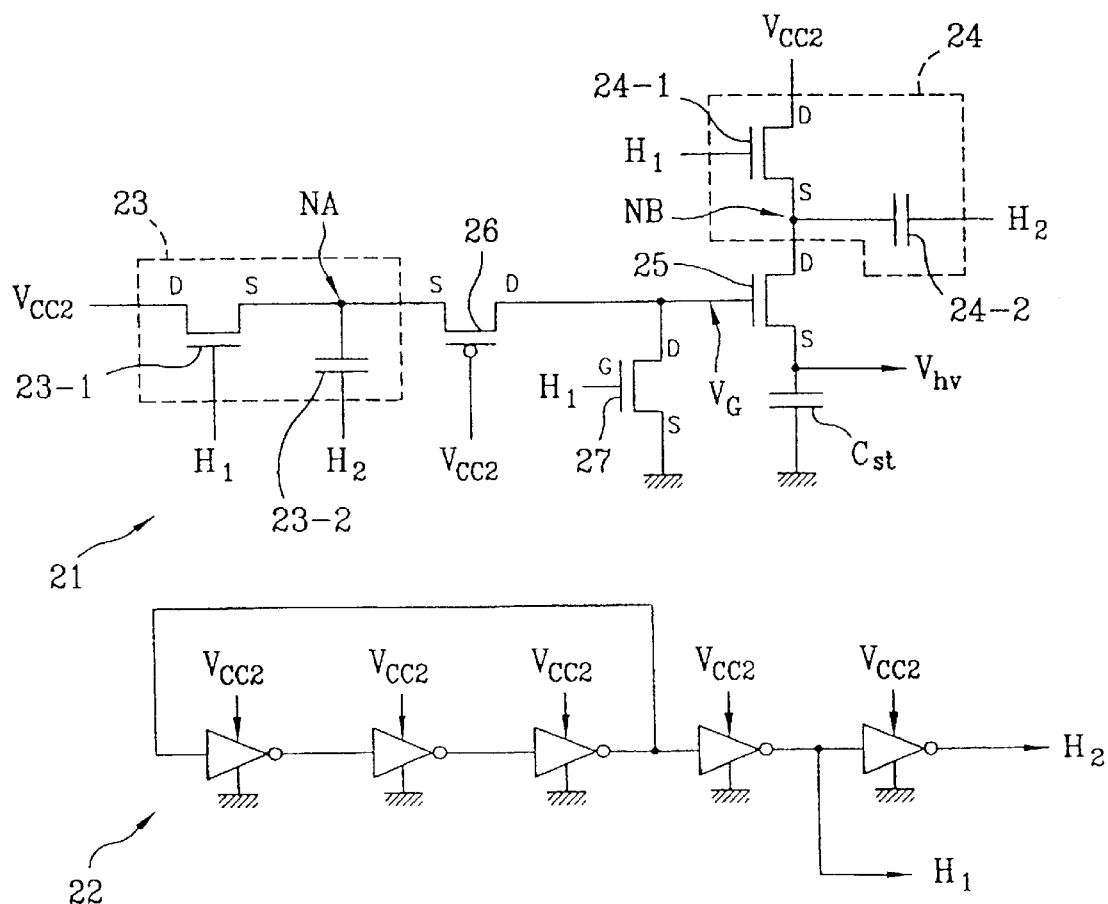
FIG. 5 is the electrical diagram of a booster circuit represented in block form in FIG. 4, FIGS. 6A to 6E illustrate the working of the booster circuit of FIG. 5.

FIG. 5 represents an embodiment, which is advantageous due to its simplicity, of the booster circuit 21, here a voltage doubling circuit working according to the principle of charge pumps. The circuit 21 is driven by two phase opposite square signals H1, H2, with the amplitude Vcc2, produced by an oscillator 22. The oscillator 22 comprises, in a conventional way, a closed loop with an odd number of inverting gates in series. The form of the signals H1 and H2 is illustrated in FIGS. 6A and 6B. The booster circuit 21 comprises two charge pumps 23, 24, each comprising a NMOS transistor 23-1, 24-1 receiving the voltage Vcc2 on its drain D, and a capacity 23-2, 24-2 connected to the source S of the transistor. The gate G of the transistors 23-1, 24-1 is fed by the signal H1 and the free terminal of the capacities 23-2, 24-2 by the signal H2. On the outputs of the charge pumps 23 and 24, indicated by the nodes NA and NB, there is found, after a stabilisation time, a voltage oscillating between the following levels n1 and n2:

n1=Vcc2−VT, when H1=1 and H2=0
and
n2=2Vcc2−VT, when H1=0 and H2=1

VT being the threshold voltage of the NMOS transistors. To have a better idea, the voltage on the nodes NA and NB are shown in FIG. 6C.

The voltage on the node NB is applied to the drain D of a NMOS transistor 25 whose source S is connected to a storing capacity Cst providing the voltage Vhv. The gate of the transistor 25, at the voltage VG, is driven by the node NA by means of a PMOS transistor 26 receiving on its gate G the voltage Vcc2, the role of the transistor 26 being to insulate the voltage VG from the node NA when the signal H1 is at 1. When the voltage VG is thus insulated from the node NA, a NMOS transistor 27 driven by the signal H1 connects the gate G of the transistor 25 to ground so as to turn OFF this transistor and prevent a leakage of the voltage Vhv towards the node NB. Controlled in this way, the transistor 25 lets only pass the level n2 of the voltage of the node NB and ensures a rapid charge of the capacity Cst to a value equal to the level n2 to which is subtracted the threshold voltage VT of the transistor 25, thus:

*Vhv=2Vcc2−2VT*

To have a better idea, FIG. 6D represents the aspect of the voltage VG and FIG. 6E represents a graph illustrating the apparition of the boosted voltage Vhv.

FIG. 7 represents an advantageous embodiment of the detector 8, in the form of an oscillation detector 30. The detector 30 comprises a bi-directional inverting gate 31 composed of two inverting gates 32, 33, arranged top to bottom, whose input and output can be set to 0 by two MOS transistors 34, 35 respectively driven by the positive Va1 and negative Va2 half waves of the voltage Va. A D flip-flop 36 with two complementary clock inputs CK and /CK is connected to the bi-directional gate 31 by the input CK, the input CK being fed back to the input /CK by means of an inverting gate 37. The input D of the flip-flop 36 is maintained to 1 (that is to the voltage Vccint) and the output Q provides the signal CTL. Thus, when an oscillation appears on the terminals of the coil L, the transistors 34 and 35 are turned ON the one after the other. The flip-flop D sees first of all a rising front on its input CK, then a rising front on its input /CK. The output Q copies then the input D and the signal CTL switches to 1.

As indicated above, the state of the distribution system 10 can be locked once the supply voltage Vcc1 or Vcc2 is stabilised. For example, on FIG. 7, the signal CTL can be locked by means of a second D flip-flop receiving on its input D the signal CTL and on its clock input the conventional switching on POR signal.

The oscillation detector 30 which has just been described has the advantage of being particularly rapid, one complete oscillation only of the voltage Va (that is two half waves Va1 and Va2) being sufficient to set the signal CTL to 1. In FIG. 8, another embodiment of the detector 8 is shown, in the form of a threshold detector 40. Although slower to activate, the circuit 40 may also be used. A half wave of the voltage Va, for example Va1, is applied by means of diode to a capacity 41, which will be chosen preferably with a small value. The capacity 41 feeds the gate of a NMOS transistor 42. The transistor 42 is connected between ground and the input of a bidirectional inverting gate 43, whose output provides the signal CTL. When the charge of the capacity 41 reaches the threshold voltage VT of the transistor 42, the transistor 42 turns On and resets the input of the gate 43 whose output CTL switches to 1. A reset transistor 43, driven by a signal RST, may be provided at the output of the bi-directional gate 43.

In the foregoing, various embodiments of the present invention have been described, wherein the switch 6 of FIG. 2 takes the form of a NMOS transistor. It will be however apparent to the man skilled in the art that several transistors or any other commutation means can be provided to perform the switching function. In particular, the man skilled in the art will note that a NMOS switching-transistor in the open state (non conducting) allows to stop positive voltage electrostatic discharges with respect to ground, but lets pass negative voltage electrostatic discharges. Thus, according to one embodiment of the present invention, a PMOS transistor is added in series with the NMOS transistor, to stop electrostatic discharges with a negative voltage.

The present invention is furthermore able to have numerous other alternative embodiments and improvements, concerning the switch control circuit, the detector of the AC voltage on the coil terminals, etc.

Furthermore, the present invention can have various applications. Thus, by reference to FIGS. 1 and 2 together, if it is imperative that the block 4 of the microcircuit is connected to the internal distribution line 5 for being supplied in the two operating modes of the microcircuit 1, the supply input of the block 3 can on the contrary be directly connected to the contact p1, for example if the electrical characteristics of bloc 3 are incompatible with the rectified voltage Vcc1.

Finally, it can be noted that the voltage distribution system which has been described comprises a minimum of elements allowing to achieve the searched result with a minimal cost and a reduced size on a microcircuit's silicon surface. However, nothing is against the fact that other switching means are provided, for example a switch arranged between the output of the diode bridge Pd producing the rectified voltage Vcc1 and the distribution line 5, provided that this switch is controlled, in conformity with one of the object of the invention, by a booster circuit so as not to decrease the contactless communication perimeter between a chip card and its reader. This supplementary switch may, for example, be closed when the voltage Vcc1 appears, and open in the other cases, and allow the insulation of the circuits specific to the contactless operating mode from the voltage Vcc2.

It will be appreciated by those skilled in the art that changes could be made to the embodiment(s) described above without departing from the broad inventive concept thereof it is understood, therefore, that this invention is not limited to the particular embodiment(s) disclosed, but it is intended to cover modifications within the spirit and scope of the present invention as defined by the appended claims.

I claim:

1. Microcircuit mounted on a portable support with two operating modes, contact or contactless, comprising :

communication means (2) specific to the contactless operating mode, communication means (3) specific to the contact operating mode, and electronic means (4) common to the two operating modes, a coil (L) for receiving an alternating voltage (Va) by induction, a circuit (Pd) which rectifies said alternating voltage (Va) for producing a first supply voltage (Vcc1) of the microcircuit, at least a supply contact (p1) for receiving a second supply voltage (Vcc2) of the microcircuit, a line (5) for distributing the first (Vcc1) or second (Vcc2) supply voltage, a switching means (6, 13) arranged between the supply contact (p1) and the distribution line (5), and means (7, 8, 20, 21, 30, 40) for controlling the switching means, characterised in that the means for controlling the switching means comprise:

detection means (8, 30, 40) designed to detect the presence of the alternating voltage (Va) on the terminals of the coil (L) and provide a control signal (CTL) distinct from the first supply voltage (Vcc1), the control signal (CTL) having a first value when the alternating voltage (Va) is not detected and a second value when the alternating voltage (Va) is detected, and means (7, 20, 21) for closing and opening the switching means (6, 13), designed to close the switching means when the second supply voltage (Vcc2) is present and the control signal (CTL) has said first value, and to open in priority the switching means when the control signal has said second value.

2. Microcircuit mounted on a portable support according to claim 1, characterised in that:

the switching means (6, 13) is naturally in the open state, the means (7, 20, 21) for closing and opening the switching means (6, 13) are supplied from the supply contact (p1), so that the closing and opening means (7, 20, 21) are disabled when the second supply voltage (vcc2) is absent, and the switching means naturally remains in the open state.

3. Microcircuit mounted on a portable support according to claim 1, wherein the output of the rectifier circuit (Pd) is directly and permanently connected to the distribution line (5).

4. Microcircuit mounted on a portable support according to claim 1, wherein said detection means comprise an oscillation detector (30) of the alternating voltage (Va).

5. Microcircuit mounted on a portable support according to claim 1, wherein said detection means comprise a threshold detector (40) of the alternating voltage.

6. Microcircuit mounted on a portable support according to claim 1, wherein the means (20) for closing and opening the switching means (6, 13) comprise a booster circuit (21) producing a boosted voltage (Vhv) for closing the switching means.

7. Microcircuit mounted on a portable support according to claim 6, wherein the booster circuit (21) comprises a first charge pump (24) whose output is applied to a storing capacity (Cst) by means of a transistor (25) driven by a second charge pump (23) operating in phase with the first charge pump.

8. Microcircuit mounted on a portable support according to claim 1, wherein the switching means (6, 13) comprises a transistor (13) having a conductive threshold voltage (VT).

9. Microcircuit mounted on a portable support according to claim 8, wherein the switching means (6) comprises a NMOS transistor (16) and a PMOS transistor arranged in series.

10. Microcircuit mounted on a portable support according to claim 1, wherein the communication means which are specific to the contact mode (3) are supplied from the supply contact (p1), and the means (4) which are common to the two operating modes are supplied from the distribution line (5).

11. Microcircuit mounted on a portable support according to claim 1, wherein the microcircuit mounted on a portable support is a chip card.

* * * * *